Oct. 15, 1935.  W. B. NORMELLI  2,017,471
ABSORPTION REFRIGERATING MACHINE WITH HEAT RECOVERY
Filed Aug. 20, 1929  2 Sheets-Sheet 2
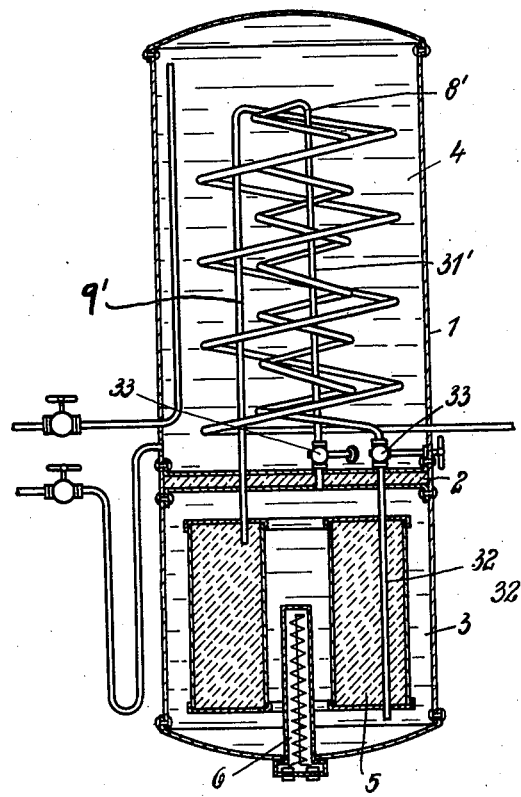
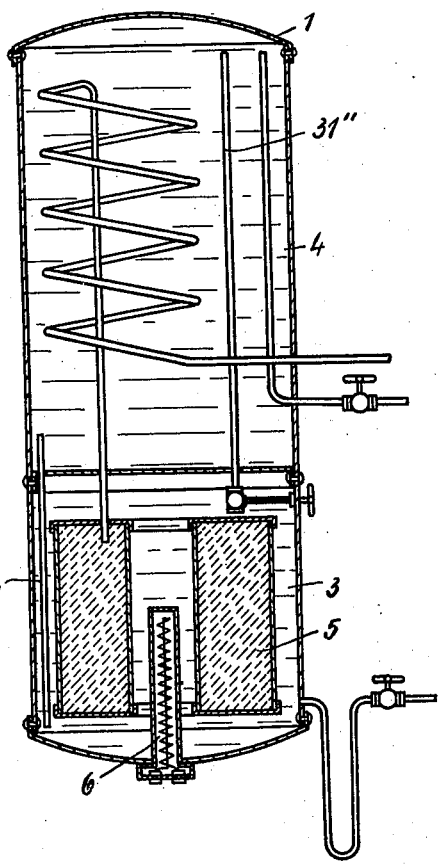
INVENTOR
Wulf B. Normelli
By Robb & Robb
ATTORNEYS Patented Oct. 15, 1935

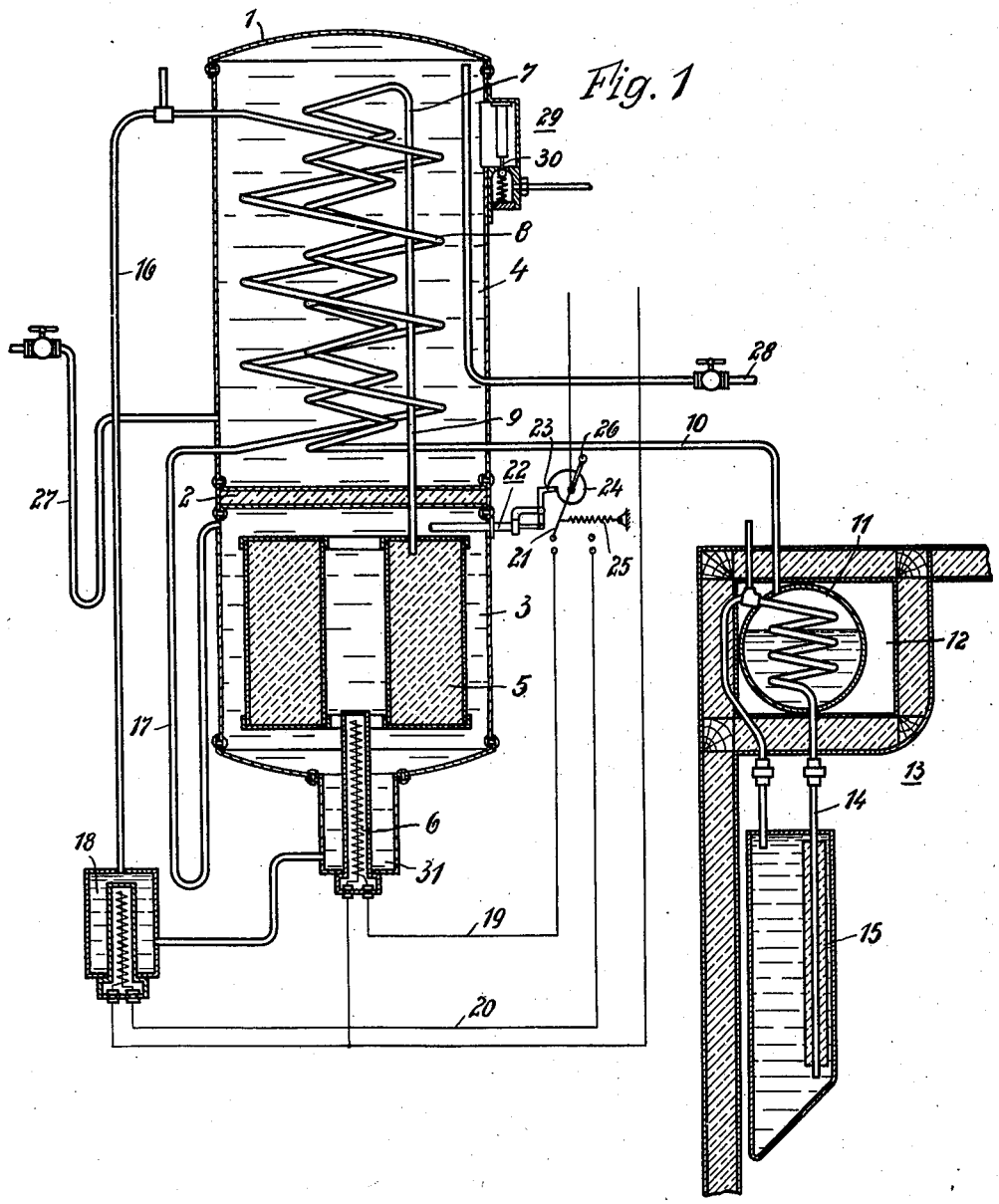

2,017,471

UNITED STATES PATENT OFFICE 2,017,471

ABSORPTION REFRIGERATING MACHINE WITH HEAT RECOVERY

Wulf Berzelius Normelli, Strasbourg, France

Application August 20, 1929, Serial No. 387,221
In Germany August 21, 1928

10 Claims. (Cl. 62—118)

My invention relates to an absorption refrigerating machine in which the condensation heat as well as the absorption heat are recovered almost without any losses and usefully employed for economical purposes.

I perform this task by combining the absorber-generator of the refrigerating machine with a liquid container, a warm water accumulator for instance, the content of which alternately serves to cool and liquefy the gas of the refrigerant driven out of the absorber-generator during the heating period and to cool the absorber-generator during the cooling period, the heat exchange taking place in each case being produced either directly or by means of an auxiliary gaseous or liquid medium conducted in a closed circuit.

Owing to this combination the refrigerating machine is operated at small cost, since not only the heat spent by heating the absorber but also the heat taken up in the cooling process is usefully employed for the warming of liquid.

In the accompanying drawings some embodiments of my invention are illustrated in a diagrammatic form in which Fig. 1 is a diagrammatic view of one form of my invention using a periodic absorption refrigerating apparatus operating with solid substances and provided with devices for utilizing the waste heat;

Fig. 2 illustrates a modified form of such an apparatus, and

Fig. 3 shows a third form of the same.

1 is a container or receptacle divided by an intermediate wall 2 in two chambers 3 and 4. In the chamber 3 the absorber-generator 5 and its heating device 6 are located, the former being filled up with solid absorbents of the kind undergoing a chemical combination with the refrigerant and by so doing or by decomposing this combination release or require an amount of heat which is of 4 kilogramme calories per gramme molecule of the refrigerant higher than the heat of evaporation per gramme molecule of said refrigerant. Such substances are: halogen—combinations of calcium, strontium baryum, magnesium, zinc, cadmium, lithium, manganese, cobalt and lead in combination with ammonia or amines as refrigerants.

In the chamber 4 two concentric coils 7, 8 are located; the former serves as a condenser and it is connected to the absorber 5 by a pipe 9 and to the evaporator 11 by a pipe 10. The evaporator is arranged within a heat insulating chamber 12 of the cooling safe 13 and it is combined by means of a circuit system 14 with a cold accumulator 15 placed in the cooling chamber. This disposition aims to prevent heat from entering into the cooling chamber during the heating period and to bring the cooling effect to said chamber during the cooling period. The second coil is connected by means of a pipe line 16 to an appendage 31 of the bottom of the chamber 3 containing the absorber and by means of a pipe line 17 to the top part of said chamber. In the former pipe line an auxiliary electric heating device 18 is placed while the latter reaches beneath the bottom of the absorber-generator chamber 3. The supplying wires 19, 20 of the heating devices 6 and 18 are both connected to a changing switch 21 in such a manner that the electric current may alternately come either to the main or to the auxiliary heating device. Said changing switch is controlled by a thermostat 22 located in the absorber chamber 3 and combined with an instantaneously acting cutting off device 23, 24, 25. The inverse controlling is operated by hands by means of a hand lever 26. The chamber 4 is completely filled up with water to which the condensation and the absorption heat are to be transmitted, said water being supplied by a pipe line 27 and delivered by a pipe line 28. Besides, a valve 30 controlled by a thermostat 29 has for its object to permit the automatic outlet of the water when reaching a certain predetermined maximum temperature. The chamber of the absorber-generator and the coil in connection with it are filled up with chemically pure water or any other appropriate liquid or gaseous medium.

During the heating period the refrigerant driven out of the absorber-generator is liquefied in the condenser 7 and stored in the evaporator 11 in a liquid state. When the heating period has come to an end, which can easily be perceived by a strong increasing of heat in the chamber 3, the thermostat puts the changing switch 21 to the line supplying the auxiliary heating device 18. Thus intense heating of the medium confined in the pipe line 16 is produced and a medium circulation is started which leads the medium from the chamber 3 through the line 16 to the coil 8 in chamber 4 and through the line 17 back to chamber 3. During this circulation the absorber-generator is cooled in a very efficacious manner and as a result, I obtain warm water in the chamber 4 and a cooling effect in the cooling safe 13.

In the construction shown in Fig. 2 the upper end of the coil 8' is connected by means of a pipe 31' to the top part and by means of a pipe 32 to the bottom of the absorber-generator chamber 3. In both pipes cocks 33 are arranged which are controlled either by hand or automatically by means of a thermostat. During the cooling period these cocks are opened and a circulation of the medium confined in the absorber generator chamber 3 and the coil 8' then takes place, causing the heat radiated by the absorber-generator to be brought to the water confined in the chamber 4.

While the examples of performance now described show the exchange of heat between the medium of the absorber-generator chamber and the water of the chamber 4 taking place in closed conduits, in order to prevent a direct contact between both of the mediums, the construction illustrated in Fig. 3 is arranged so that the water to be heated uniformly fills up the chambers 3 and 4 and is led from the chamber 4 to the chamber 3 and back through the pipes 31'' and 32', thus carrying out the heat exchange. This example of performance is advantageously employed in cases where the production of lime—or other sediments and obstructions of pipes which result from such sediments is not to be feared.

It is well understood, that my invention may have every other suitable embodiment and that I do not limit it on the sole examples described and illustrated.

I claim:

1. In an absorption refrigerating machine of the class described, a liquid container, means for dividing the liquid container into two chambers, an absorber-generator and a heating device therefor disposed in one of said chambers, a body of liquid to be heated in the other of said chambers, an absorbent substance in the absorber-generator comprising a chemical compound in solid state and a chemically combined refrigerating medium, a liquid medium in the absorber generator chamber, means for conducting the last named medium in a closed circuit through the chamber containing the liquid to be heated, means for starting and stopping the said circulation, condensing means for condensing the refrigerating medium driven out of the absorber-generator, means for evaporating the refrigerant and means for supplying the liquid container with liquid and carrying the liquid away from said container to use.

2. In an absorption refrigerating machine, the combination of an absorber-generator, an absorbent substance therein comprising a chemical compound in solid state and a chemically combined refrigerating medium, a liquid container having means to divide the same into two separate chambers, the absorber generator aforesaid and a heating device therefor being disposed in one of said chambers, water disposed in the other of said chambers, a liquid medium in the absorber generator chamber, a coil in the water chamber, a pipe from the bottom of the absorber generator chamber to the upper end of the coil aforesaid, an auxiliary heating device in said pipe, a pipe reaching beneath the bottom of the absorber generator chamber from the top part thereof to the lower end of the coil, means for alternately supplying heating energy to the heating device for the absorber generator and to the auxiliary heating device, means in one of said chambers for condensing the refrigerant driven out of the absorber generator, means for evaporating the refrigerant and means for conveying the heated liquid to use.

3. In an absorption refrigerating apparatus the combination of an absorber generator, an absorbent substance therein comprising a chemical compound in solid state, a heating device for the absorber generator, means for energizing and deenergizing said heating device, a closed circulating system, consisting of a portion in heat-exchange relation with the absorber generator, a cooler and two circulating conduits, a water tank, said cooler being arranged in said tank, said circulating system containing a liquid which upon circulation between the heat exchange surfaces of the absorber generator and the cooler carries off the heat of absorption to said water tank.

4. In an absorption refrigerating apparatus the combination of an absorber generator, an absorbent substance therein comprising a chemical compound in solid state, a closed circulating system, consisting of a portion in heat-exchange relation with the absorber generator, a cooler and two circulating conduits, said circulating system containing a liquid which upon circulating between the heat exchange surfaces of the absorber generator and the cooler carries off the heat of absorption, and a heating device for the absorber generator so disposed as to transfer the heat to the absorber generator by means of the liquid utilized for carrying off the heat of absorption.

5. In an absorption refrigerating apparatus the combination of an absorber generator, an absorbent substance therein comprising a chemical compound in solid state, a water circulating system containing a circulating medium and consisting of a portion in heat-exchange relation with the absorber generator, a cooler and two connecting conduits, the cooler of said circulating system being so disposed as to transfer the heat of absorption to the water which in turn upon flowing carries off the heat, and means for heating the absorber generator so disposed as to transfer the heat to the absorber generator by means of said circulating medium.

6. In an absorption refrigerating apparatus the combination of an absorber generator, an absorbent substance therein comprising a chemical compound in solid state, a circulating system containing a circulating medium and consisting of a portion in heat-exchange relation with the absorber generator, a cooler and two connecting conduits, a water tank, the cooler of said circulating system being so disposed as to transfer the heat of absorption to the water contained in said tank, a discharge conduit for said cooler, a valve in the discharge conduit and means for operating said valve in accordance with the temperature of the cooling medium, and means for heating the absorber generator so disposed as to transfer the heat to the absorber generator with the aid of the circulating medium.

7. In an absorption refrigerating apparatus the combination of an absorber generator, an absorbent substance therein comprising a chemical compound in solid state, said generator absorber being surrounded by a jacket containing a liquid, a cooler and connecting conduits between the absorber generator jacket and said cooler so disposed that the liquid contained in the system circulates continuously in a liquid state during the period of absorption, means for heating the absorber generator, said means being so arranged as to transfer the heat to the absorber generator by means of the circulating liquid, and devices for controlling the circulation of liquid, said devices being controlled by devices operating in accordance with the temperature of the circulating liquid.

8. In an absorption refrigerating apparatus of the intermittent type the combination of a generator-absorber, an absorbent which forms a chemical compound with the refrigerant, a heating element for the generator-absorber, means for energizing and deenergizing said heating element, a closed heat-transfer system comprising a part in heat exchange with said generator-absorber, a cooler and connecting means between said part and said cooler, a water tank, the cooler being arranged in said water tank, the heat transfer system containing a fluid which carries off the heat of absorption from the heat exchange surfaces of the generator-absorber to the cooler, and which in turn gives up heat to the water tank.

9. In an absorbtion machine, the combination of an absorber-generator, an absorbent substance therein comprising a chemical compound in solid state and a chemically combined refrigerating medium, a liquid container containing a body of liquid for storage of the heat, said container being divided into two chambers, means for effecting heat exchange circulation between the two chambers, means for starting said heat exchange circulation at a predetermined maximum temperature, a heating device for the absorber-generator, said absorber-generator and heating device being disposed in one of said chambers, means for stopping and starting the heating device, means for condensing the refrigerant driven out of the absorber-generator disposed in the other of said chambers, means for evaporating the refrigerant, a connecting pipe extending from the condenser to the absorber-generator, an outlet pipe extending from the condenser to the evaporating means, means for practical use of the produced cold, means in the chamber containing the condenser for carrying out the heat exchange between the absorber-generator and the liquid of the liquid container, means for supplying the liquid container with liquid, and means for carrying off the heated liquid from said container.

10. In an absorption machine, the combination of an absorber-generator, an absorbent substance therein comprising a chemical compound in solid state and a chemically combined refrigerating medium, a liquid container containing a body of liquid for storage of the heat, means for dividing the container into two chambers, a heating device for the absorber-generator, said absorber-generator and heating device being located in one of said chambers, means for starting and stopping the heating device, means for condensing the refrigerant driven out of the absorber-generator, means for evaporating the refrigerant, means for practical use of the produced cold, means for carrying out a heat exchange between the absorber-generator and the liquid of the liquid container, said last named means being disposed in the other of said chambers and consisting of a conduit which enters the chamber containing the absorber-generator in the upper and lower portion thereof, the medium for the transfer of heat being contained in said conduit and the chamber connected therewith, means for supplying the liquid container with liquid, means for carrying off the heated liquid from said container, and means in said system for starting the heat exchange during the absorption period and for stopping the heat exchange during the heat period.

WULF BERZELIUS NORMELLI.